United States Patent
Seguine

(10) Patent No.: US 8,508,244 B2
(45) Date of Patent: Aug. 13, 2013

(54) METHOD FOR IMPROVING SCAN TIME AND SENSITIVITY IN TOUCH SENSITIVE USER INTERFACE DEVICE

(75) Inventor: Ryan D. Seguine, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 280 days.

(21) Appl. No.: 12/167,494

(22) Filed: Jul. 3, 2008

(65) Prior Publication Data

US 2009/0009195 A1     Jan. 8, 2009

Related U.S. Application Data

(60) Provisional application No. 60/947,895, filed on Jul. 3, 2007.

(51) Int. Cl.
    *G01R 27/26*     (2006.01)
(52) U.S. Cl.
    USPC .......... 324/686; 324/658; 345/173; 345/174; 341/33
(58) Field of Classification Search
    USPC ......................................................... 324/686
    See application file for complete search history.

(56) References Cited

U.S. PATENT DOCUMENTS

| | | | | |
|---|---|---|---|---|
| 4,918,262 A * | 4/1990 | Flowers et al. | ................ | 345/173 |
| 4,935,728 A * | 6/1990 | Kley | ............................ | 345/161 |
| 5,239,140 A * | 8/1993 | Kuroda et al. | ............. | 178/18.01 |
| 5,374,787 A * | 12/1994 | Miller et al. | ................ | 178/18.06 |
| 5,495,077 A | 2/1996 | Miller et al. | | |
| 5,648,642 A * | 7/1997 | Miller et al. | ................ | 178/18.06 |
| 5,825,352 A | 10/1998 | Bisset et al. | | |
| 5,841,078 A * | 11/1998 | Miller et al. | ................ | 178/18.06 |
| 5,872,561 A | 2/1999 | Figie et al. | | |
| 5,920,309 A | 7/1999 | Bisset et al. | | |
| 6,292,173 B1 * | 9/2001 | Rambaldi et al. | ............. | 345/157 |
| 6,396,484 B1 | 5/2002 | Adler et al. | | |
| 6,762,752 B2 | 7/2004 | Perski et al. | | |
| 7,019,672 B2 | 3/2006 | Ely | | |
| 7,100,430 B2 | 9/2006 | Samsavar et al. | | |
| 7,307,485 B1 | 12/2007 | Snyder et al. | | |
| 7,375,535 B1 * | 5/2008 | Kutz et al. | ..................... | 324/658 |
| 7,428,191 B1 | 9/2008 | Klein | | |
| 7,982,723 B2 | 7/2011 | Ningrat | | |

(Continued)

FOREIGN PATENT DOCUMENTS

WO     2012177571 A     12/2012

OTHER PUBLICATIONS

International Search Report, dated Sep. 26, 2008, entire document.

(Continued)

*Primary Examiner* — Huy Q Phan
*Assistant Examiner* — Benjamin M Baldridge

(57) ABSTRACT

System and method for optimizing the consumption of power while maintaining performance in capacitive sensor arrays. A limited sensing area is used to improve the update rate and sensitivity of a row/column array of capacitive sensors. According to one embodiment, a method is provided for scanning a plurality of capacitive sensors by: detecting a stimulus in the field of capacitive sensors, scanning the field of capacitive sensors to determine the position of the stimulus. Once the position of the stimulus is determined, a subsection of the field comprising window corresponding to the position of the stimulus remains activated while the remaining sensors in the field are deactivated.

19 Claims, 8 Drawing Sheets

(56) References Cited

U.S. PATENT DOCUMENTS

| | | | |
|---|---|---|---|
| 8,120,591 B2 | 2/2012 | Krah et al. | |
| 8,305,357 B2* | 11/2012 | Liao et al. | 345/174 |
| 8,315,832 B1* | 11/2012 | Seguine | 702/150 |
| 8,350,826 B2* | 1/2013 | Watanabe | 345/174 |
| 8,436,831 B2* | 5/2013 | Wei et al. | 345/174 |
| 8,462,127 B2* | 6/2013 | Chiu et al. | 345/173 |
| 2002/0015024 A1* | 2/2002 | Westerman et al. | 345/173 |
| 2005/0013492 A1 | 1/2005 | Hattori | |
| 2005/0068044 A1* | 3/2005 | Peine et al. | 324/658 |
| 2005/0129292 A1* | 6/2005 | Morgeneier et al. | 382/124 |
| 2005/0134292 A1* | 6/2005 | Knoedgen | 324/658 |
| 2006/0161871 A1 | 7/2006 | Hotelling et al. | |
| 2006/0192690 A1* | 8/2006 | Philipp | 341/33 |
| 2006/0197752 A1* | 9/2006 | Hurst et al. | 345/173 |
| 2006/0219692 A1 | 10/2006 | Unsworth | |
| 2007/0008299 A1* | 1/2007 | Hristov | 345/173 |
| 2007/0121959 A1* | 5/2007 | Philipp | 381/74 |
| 2007/0182718 A1* | 8/2007 | Schoener et al. | 345/173 |
| 2007/0188518 A1* | 8/2007 | Vale et al. | 345/619 |
| 2007/0229468 A1* | 10/2007 | Peng et al. | 345/173 |
| 2007/0229470 A1* | 10/2007 | Snyder et al. | 345/173 |
| 2007/0235231 A1* | 10/2007 | Loomis et al. | 178/18.06 |
| 2007/0273659 A1* | 11/2007 | XiaoPing et al. | 345/173 |
| 2008/0024455 A1* | 1/2008 | Lee et al. | 345/173 |
| 2008/0048997 A1 | 2/2008 | Gillespie et al. | |
| 2008/0079699 A1* | 4/2008 | Mackey | 345/174 |
| 2008/0150906 A1 | 6/2008 | Grivna | |
| 2008/0158180 A1* | 7/2008 | Krah et al. | 345/173 |
| 2008/0246723 A1* | 10/2008 | Baumbach | 345/156 |
| 2008/0277171 A1* | 11/2008 | Wright | 178/18.06 |
| 2009/0096757 A1 | 4/2009 | Hotelling et al. | |
| 2009/0128516 A1 | 5/2009 | Rimon et al. | |
| 2009/0160787 A1 | 6/2009 | Westerman et al. | |
| 2009/0273579 A1 | 11/2009 | Zachut et al. | |
| 2010/0007631 A1 | 1/2010 | Chang | |
| 2010/0039405 A1 | 2/2010 | Chen et al. | |
| 2010/0073301 A1 | 3/2010 | Yousefpor et al. | |
| 2010/0073318 A1 | 3/2010 | Hu et al. | |
| 2010/0097328 A1 | 4/2010 | Simmons et al. | |
| 2010/0117981 A1 | 5/2010 | Chen et al. | |
| 2010/0155153 A1 | 6/2010 | Zachut | |
| 2010/0292945 A1 | 11/2010 | Reynolds et al. | |
| 2010/0315375 A1 | 12/2010 | Yang | |
| 2011/0025629 A1 | 2/2011 | Grivna et al. | |
| 2012/0105362 A1 | 5/2012 | Kremin et al. | |
| 2012/0162124 A1 | 6/2012 | Lin | |
| 2012/0242612 A1 | 9/2012 | Chang | |
| 2012/0261199 A1 | 10/2012 | Kuo et al. | |
| 2012/0268415 A1 | 10/2012 | Konovalov et al. | |
| 2012/0280929 A1 | 11/2012 | Rimon et al. | |
| 2012/0327042 A1 | 12/2012 | Harley et al. | |

OTHER PUBLICATIONS

Written Opinion of the International Searching Authority, dated Sep. 26, 2008, entire document.

U.S. Appl. No. 13/250,379 "System and Method for Conveying a Wired Coiled Assembly ," Harold Bissonnette et al., filed Sep. 30, 2011; 60 pages.

U.S. Appl. No. 13/591,145 "Predictive Touch Surface Scanning," David G. Wright et al., filed Aug. 21, 2012; 64 pages U.S. Appl. No. 60/947,895 "Method for Impoving Scan Time and Senstivity in an Array of Capacitive Sensors," Ryan Seguine et at., filed Jul. 3, 2007, 6 pages.

Application No. PCT/US08/69108 "Method for Improving Scan Time and Sensitivity in Touch Sensitive User Interface Device," Filed on Jul. 2, 2008; 44 pages.

Application No. PCT/US10/43590 "Dynamic Mode Switching for Fast Touch Response," filed on Jul. 28, 2010; 64 pages.

International Search Report and Written Opinion for International Application No. PCT/US10/43590 dated Sep. 27, 2010: 1 page.

International Search Report for International Application No. PCT/US12/64222 dated Dec. 7, 2012; 2 pages.

USPTO Advisory Action for U.S. Appl. No. 12/844,798 dated Aug. 31, 2012; 3 pages.

USPTO Final Rejection for U.S. Appl. No. 12/844/798 dated Jun. 18, 2012, 21pages.

USPTO Non-Final Rejection for U.S. Appl. No. 12/844,798 dated Oct. 10, 2012; 19 pages.

USPTO Non-Final Rejection for U.S. Appl. No. 13/250,379 dated Oct. 16, 2012; 16 pages.

USPTO Non-Final Rejection for U.S. Appl. No. 13/591,145 dated Oct. 17, 2012; 16 pages.

Written Opinion of the International Searching Authority for International Application No. PCT/US10/43590 mailed Sep. 27, 2010; 5 pages.

Written Opinion of the International Searching Authority for International Application No. PCT/US12/64222 mailed Dec. 18, 2012; 7 pages.

U.S. Appl. No. 61/143,199: "Dual Touch Resolution on 2 Axis Touchscreen," Nelson Chow, filed Jan. 8, 2009; 7 pages.

U.S Appl. No. 12/684,791: "Multi-Touch Disambiguation," Browley Xiao, filed Jan. 18, 2010; 79 pages.

U.S. Appl. No. 13/741,090: "Multi-Stage Stylus Scanning," Ruslan Omelchuk, filed Jan. 14, 2013; 58 pages.

U.S. Appl. No. 61/587,509: "Capacitive Stylus Noise Immunity Using Tracking Sean," Mykhaylo Krekhovestskyy, filed Jan. 17, 2012; 10 pages.

U.S. Appl. No. 61/676,256: "Self-Synchronized Active Stylus Receiver with Data Communication for GEN 4 LS-AS," Victor Kremin, filed Jul. 26, 2012; 3 pages.

USPTO Advisory Action for U.S. Appl. No. 12/684,791 dated Jul. 30, 2012; 3 pages.

USPTO Advisory Action for U.S. Appl. No. 12/684,791 dated Sep. 7, 2012; 3 pages.

USPTO Advisory Action for U.S. Appl. No. 12/844,798 dated Apr. 10, 2013, 3 pages.

USPTO Final Rejection for U.S. Appl. No. 12/684,791 dated Jun. 4, 2012; 16 pages.

USPTO Final Rejection for U.S. Appl. No. 12/844,798 dated Feb. 13, 2013; 19 pages.

USPTO Final Rejection for U.S. Appl. No. 13/250,379 dated Apr. 3, 2013; 19 pages.

USPTO Final Rejection for U.S. Appl. No. 13/591,145 dated Apr. 3, 2013; 17 pages.

USPTO Non-Final Rejection for U.S. Appl. No. 12/684,791 dated Feb. 14, 2012; 15 pages.

USPTO Non-Final Rejection for U.S. Appl. No. 12/684,791 dated Nov. 16, 2012; 17 pages.

USPTO Notice of Allowance for U.S. Appl. No. 12/684,791 dated Mar. 18, 2013; 8 pages.

USPTO Advisory Action for U.S. Appl. No. 13/250,379 dated Jun. 3, 2013; 3 pages.

* cited by examiner

METHOD FOR IMPROVING SCAN TIME AND SENSITIVITY IN TOUCH SENSITIVE USER INTERFACE DEVICE

RELATED U.S. APPLICATIONS

This application claims the benefit of and priority to copending provisional patent application Ser. No. 60/947,895, entitled "Method For Improving Scan Time and Sensitivity in an Array of Capacitive Sensors," with filing date Jul. 3, 2007, and hereby incorporated by reference in its entirety.

FIELD OF INVENTION

The present application relates to sensor user interface systems such as capacitive sensor arrays. More particularly, the present application relates to methods and systems for capturing signals received from sensors and sensor arrays

BACKGROUND

Sensors are devices that respond to a stimulus and produce a signal indicative of the stimulus's magnitude, relative position, or other characteristic attributable to the stimulus. The stimulus may be any physical quantity or parameter which can affect a sensor. An array of sensors is a collection of individual sensors positioned at discrete locations to form a relative field of perception.

One type of sensor array is a capacitive sensor array. A capacitive sensor is used to detect the presence and/or absence of a conductive object, although direct contact between the conductive object and sensing element is not necessarily required. Capacitive sensors are typically constructed of a conductive pad, the surrounding ground, and its connection to a controller. In most applications, the conductive pad is a large copper footprint and the surrounding ground is a poured fill. A native (parasitic) capacitance exists between these two objects. When a third conductive object, a stimulus—such as a human finger—is brought into proximity with the sensor, the capacitance of the system is increased by the capacitance of the stimulus. Capacitive sensors are generally resistant to environmental factors, such as water, temperature and humidity, and may be used with a variety of overlay materials and thicknesses.

A capacitive sensor array typically employs a number of discrete capacitive sensors distributed over a region of the array which may be arranged in a pattern forming a grid. A grid of sensors may comprise a plurality of capacitive sensors which may be individually addressable, addressable in subsections of the grid, or in their entirety. Addressing specific sensors may be accomplished using multiplexers coupled to the sensor array according to data or select signals on multiplexer select lines to determine the individual sensors to be "driven" or "sampled."

A sensor is driven by exciting the sensor or energizing the sensor so as to produce a measurement of the stimulus at the sensor. By sampling a sensor, an output signal from the sensor is read to detect the sensor response to the stimulus. Thus, it is possible to selectively measure a signal representative of the sensor capacitance from a given capacitive sensor element located at a particular column and row of the capacitive array. Multiplexers may be used to determine the particular row and column from which a measurement is desired. These grids may be adapted to form interfaces of various sizes and shapes. For example, rectangular touch pads are common in PDAs and mobile handsets. Other embodiments include linear and radial interfaces.

Applications in which such sensor arrays are useful include touch pads and distributed sensors that provide an indication of the location and magnitude of a force or a pressure applied to a region of interest. These applications may be used in user interfaces of computing devices, such as notebook computers, personal data assistants (PDAs), and mobile handsets. Other applications in which sensor arrays have been incorporated include kitchen appliances, exercise equipment and other consumer electronics.

As consumer electronic devices continue to reduce in size, so too, do their user interfaces. A smaller capacitive sensor user interface typically means smaller individual capacitive sensors within the user interface. Generally, shrinking the size of a capacitive sensor adversely affects its sensitivity, resulting in a detrimental effect on the user experience (such as slower response time, reduced accuracy). Decreased sensitivity due to shrinking sensor size can be partially compensated by increasing the sampling time of a particular capacitive sensor. However, increasing the sampling time for each capacitive sensor within an array of capacitive sensors reduces the response time of the user interface while simultaneously increasing the rate of power consumption. For mobile devices which have a limited power source (e.g. battery-powered devices), this can contribute to a reduced user experience.

SUMMARY

Conventional implementations of capacitive sensing arrays scan all rows and columns during an active mode to determine the position of stimulus. However, this method wastes power since sensors which are not relevant to the position of the stimulus are scanned as well. Accordingly, scanning these sensors is an inefficient use of time (the time used to scan), and power. Embodiments of the present invention are directed to using a limited sensing area to improve the update rate and sensitivity of an array of capacitive sensors.

In accordance with one embodiment, scanning includes three modes. The first mode is used when no finger is present and all sensors are scanned at a slower rate, or a subsection of sensors are scanned at the normal rate. This is a coarse scan over the entire row/column array. The second state has all of the sensors scanned at the maximums rate. This is to determine where the finger is on the array and develop the background number of sensors to scan in the third, power saving mode. The third mode scans only those sensors that were determined to be active in the second mode plus some additional sensors in all directions, thus creating a "scan halo." This third mode is maintained until the finger is released.

In one embodiment, a method for scanning a plurality of capacitive sensors is provided. The method includes: detecting a stimulus in a field of capacitive sensors, scanning the field of capacitive sensors to determine the position of the stimulus, and scanning a window of sensors corresponding to the position of the stimulus within the field.

Another embodiment provides a method for scanning a capacitive sensor array. The method includes: detecting the presence of a finger in the capacitive sensor array, determining the location of the finger in said capacitive sensor array during a first mode, forming a halo of capacitive sensors corresponding to the location of the finger, scanning the halo of capacitive sensors during a second mode, and modifying the halo of capacitive sensors according to a displacement of said finger during said second mode.

Still another embodiment provides a system for scanning for a position of a stimulus in a field of capacitive sensors, the system. The method includes: a controller; and an array of capacitive sensors. When the presence of a stimulus is detected, the capacitive sensors are scanned at a maximum rate to determine the position of the stimulus during a first state, and a subsection of capacitive sensors comprising the position of the stimulus along with a plurality of capacitive sensors corresponding to a possible motion of the stimulus are scanned during a second state.

BRIEF DESCRIPTION OF DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, and components, have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Figure 1:
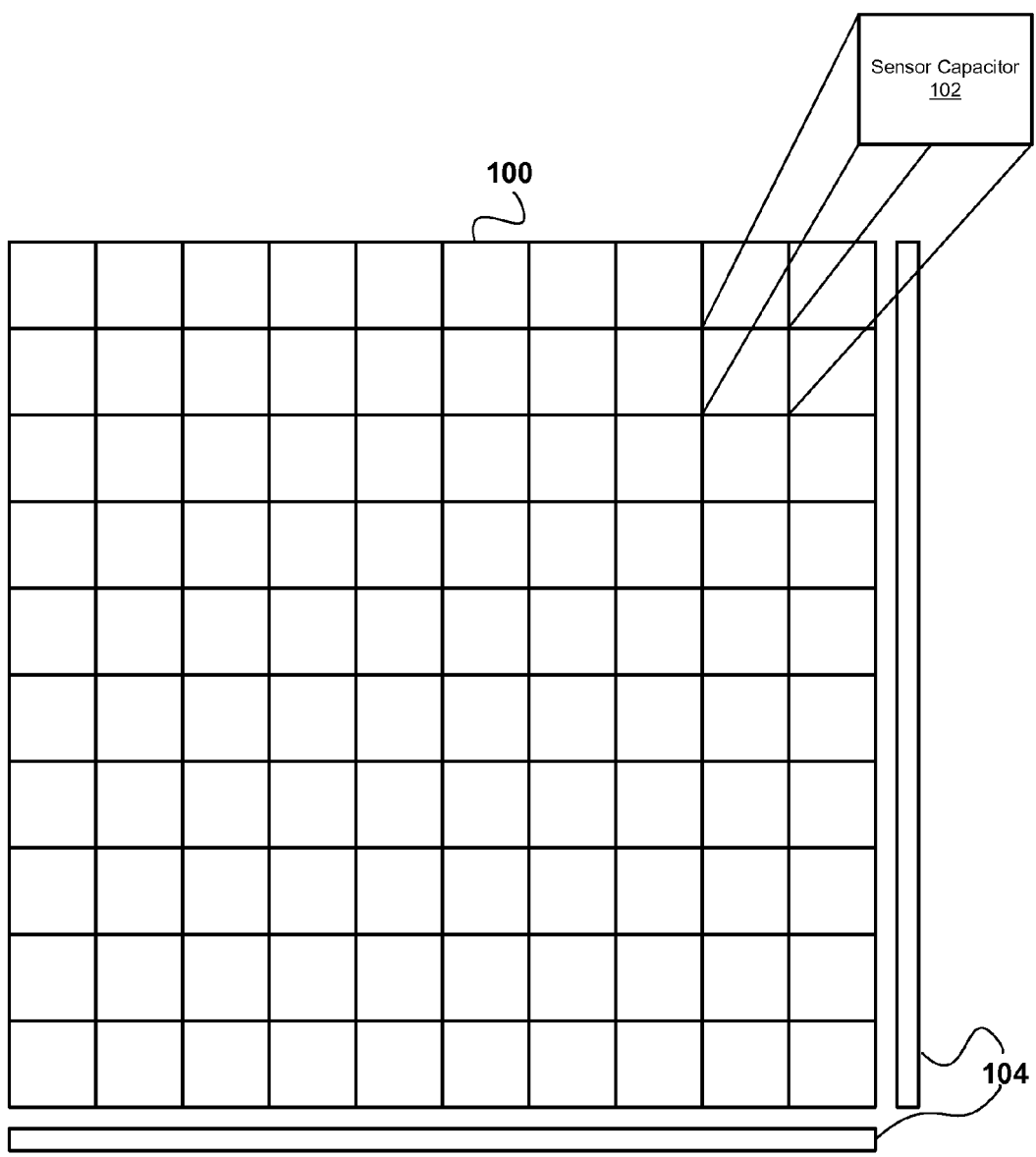
FIG. 1 shows block diagram of an exemplary capacitive sensor array, in accordance with one embodiment of the present invention

FIG. 1 shows block diagram of an exemplary capacitive sensor array, in accordance with one embodiment of the present invention. Capacitive sensor array 100 may provide a user interface (e.g., touchpad, track pad, touch screen, and the like) for a variety of devices including, but not limited to, servers, desktop computers, laptops, tablet PCs, mobile devices, music devices, video devices, cellular telephones, and smartphones. Capacitive sensor array 100 may include a plurality of sensor devices in a row and column configuration. Sensor circuit 102 illustrates an exemplary sensor device in capacitive sensor array 100. Capacitive sensor array 100 may be configured in a variety of ways including, but not limited to, a square, a rectangle, a circle, or a ring. Connections 104 facilitates coupling of capacitive sensor array 100 to a reporting or data processing resources for reporting to a coupled device (e.g., computing device). Another possible structure for a capacitive sensing array is described in US Patent Application 2007/0229470.

In one embodiment, capacitive sensor array 100 is made of a material having an impedance which impacts signals received from sensor circuits remote from connections 104. For example, signals from sensor circuits in the upper left of capacitive sensor array 100 may be reduced or impacted by serial impedance as the signal travels to connections 104. This is especially true for high impedance capacitive sensors. It is appreciated that as the distance between connections 104 and a sensor circuit of capacitive sensor circuit array 100 increases the impact of the impedance of capacitive sensor circuit array 100 increases.

Exemplary Circuits

FIGS. 2-5 illustrate example components used by various embodiments of the present invention. Although specific components are disclosed in circuits 200, 300, 400, and 500 it should be appreciated that such components are examples. That is, embodiments of the present invention are well suited to having various other components or variations of the components recited in systems 200, 300, 400, and 500. It is appreciated that the components in systems 200, 300, 400, and 500 may operate with other components than those presented, and that not all of the components of systems 200, 300, 400, and 500 may be required to achieve the goals of systems 200, 300, 400, and 500.

Figure 2:
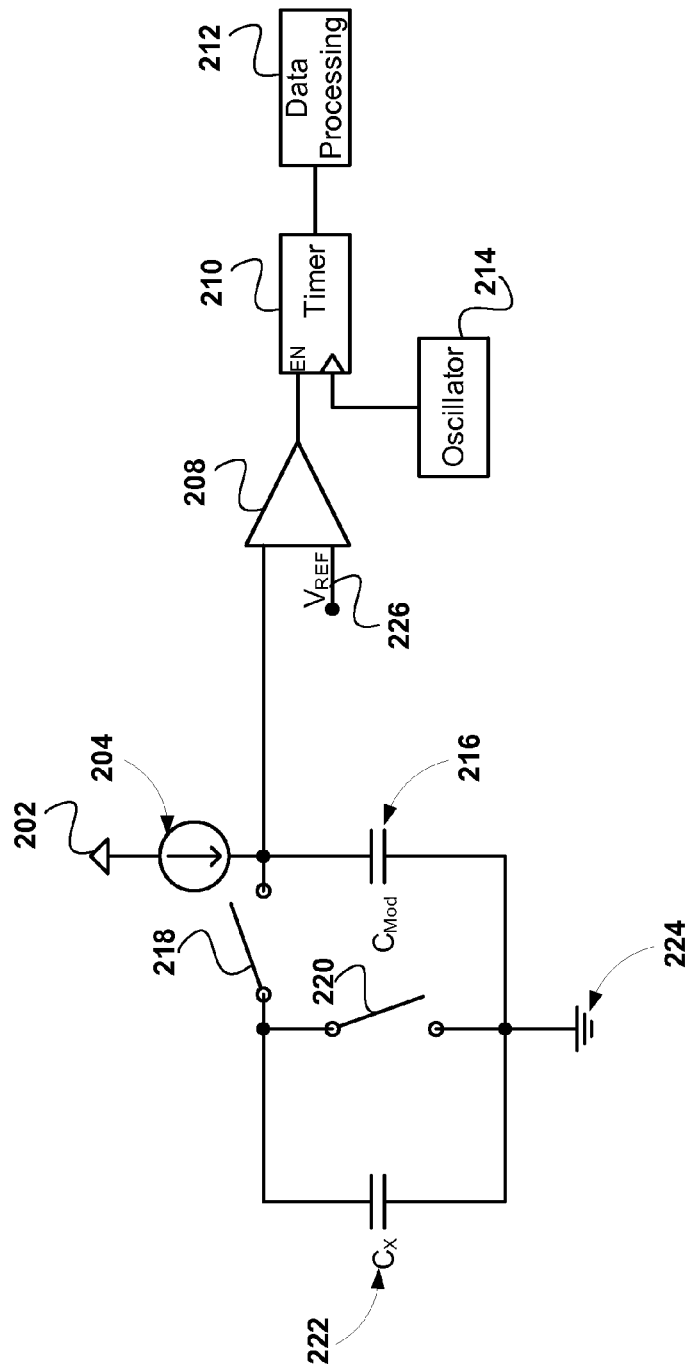
FIG. 2 shows an exemplary sensor circuit, in accordance with one embodiment of the present invention.

FIG. 2 shows an exemplary sensor circuit 200, in accordance with one embodiment of the present invention. Sensor circuit 200 includes Vdd signal 202, current source 204, comparator 208, timer 210, data processing module 212, oscillator 214, reference voltage 226, external modification capacitor 216, ground signal 224, sensor capacitor 222, switch 220 and switch 218. Current source 204 may be a current DAC (Digital to Analog converter). Circuits of the type shown in FIG. 2 are described in more detail in U.S. Pat. Nos. 7,307,485 and 7,375,535.

In one embodiment, circuit 200 may operate in three phases. In a first phase, switch 218 alternatively couples current source 204 to sensor capacitor 222 and current source 204 charges or settles external modification capacitor 216 to a start voltage, Vstart. In one embodiment, the start voltage may be governed by the voltage current function expressed by:

$$V_{Start} = \frac{1}{f \cdot C_x} \cdot iDAC$$

Where f is frequency of the switching of switch 218, Cx is the capacitance of the sensor capacitor 222, and iDAC is the current of current source 204.

It is appreciated that the capacitance of sensor capacitor 222 varies with the presence of objects (e.g., a finger). For example, the presence of a finger may increase the capacitance and thereby result in a lower starting voltage. Conversely, a higher starting voltage may result from no finger being present.

In a second phase, the sensor capacitor 222 is decoupled from current source 204 by switch 218 and sensor capacitor 222 is discharged by coupling to ground signal 224 via switch 220. External modification capacitor 216 may be charged by current source 204 until it increases to reference voltage 226 and comparator 208 is tripped which disables timer 210. In one embodiment, voltage on the external modification capacitor 216 is reduced through a low pass filter in series with external modification capacitor 216 to the input of comparator 208. Scan time is measured during this second phase.

In one embodiment, timer 210 is a counter (e.g., 16-bit). The raw number of counts on timer 210 may be used to determine if a finger is present on sensor capacitor 222. The raw counts are taken after each measurement sequence (e.g., after each charge of sensor capacitor 222 and tripping of comparator 208) and then compared to a stored baseline number of counts with no finger present on sensor capacitor 222. If the difference between the raw counts and the baseline counts exceeds a threshold, then sensor activation is detected. The value of the counter may measure the elapsed time to get to the threshold or reference voltage 226 and can then be used to determine what the start voltage was, and therefore the capacitance value.

For example, when no finger present 100 cycles may be required to bring the voltage across external modification capacitor 216 to reference voltage 226. When a finger is present, 105 cycles may be required to bring the voltage across external modification capacitor 216 to reference voltage 226. If there is a threshold of three cycles to indicate the presence of an object, as long as the number of the change in cycles is greater than three, the sensor may be determined to be active. It is appreciated that a difference threshold of larger than zero prevents noise or other interference from appearing as an active sensor.

The time (or count) measured by timer 210 may be used by data processing module 212 to process the data and make decisions based on the capacitive inputs (e.g., sensors triggered by presence of a finger). Lower starting voltages (e.g., when a finger is present) leads to longer charge times as the current from the current source 204 flows into the external modification capacitor 216 and increases the voltage at the same rate. If the start voltage is low, the time or count measured by timer 210 will be relatively large because current source 204 will have to provide more charge to external modification capacitor 216 to reach reference voltage 226. If the start voltage is relatively high (e.g., no finger present), the time or count measured by time 210 is low as current source 204 provides less current to external modification capacitor 216 to reach reference voltage 226.

In a third phase, the sensor scan is completed and current source 204 is turned off. During the third phase, the time or count from timer 210 may be processed and stored. Voltage on the external modification capacitor 216 decreases as charge dissipates by leakage currents until the next scan begins. In one embodiment, the amount of time that the voltage decreases is strictly dependent upon the firmware between each scan and the CPU (Central Processing Unit) clock speed. It is appreciated that the next scan may then start with the first phase on the same sensor circuit or another sensor circuit (e.g., an adjacent or active sensor circuit).

In another embodiment, comparator 208 may be replaced with an analog-to-digital converter (ADC). Charge from the sensor capacitor 222 is transferred to external modification capacitor 216 acting as a filter capacitor for a prescribed number of cycles. After the prescribed number of cycles is complete, the voltage on external modification capacitor 216 is measured and the output of the ADC is proportional to the size of sensor capacitor 222. The measured value of the ADC may then be used to determine the presence of an object.

Figure 3:
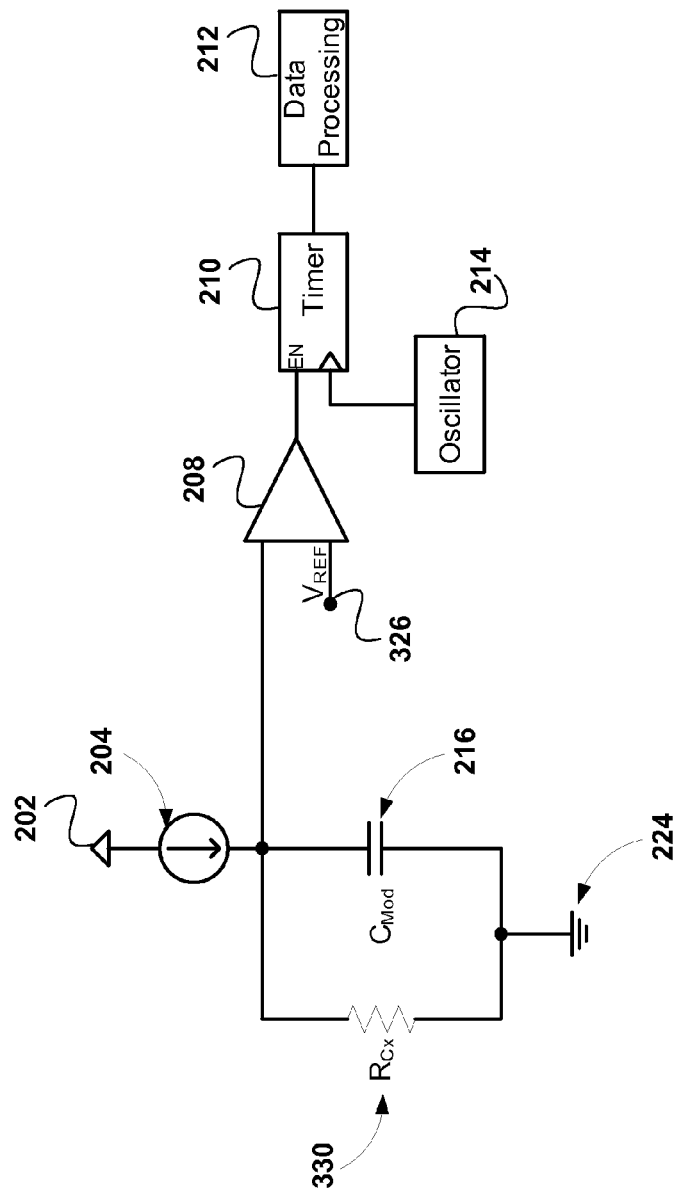
FIG. 3 shows the exemplary sensor circuit of FIG. 2 with an equivalent resistance, in accordance with an embodiment of the present invention.

FIG. 3 shows the exemplary sensor circuit of FIG. 2 with an equivalent resistance. Sensor circuit 200 includes Vdd signal 202, current source 204, comparator 208, timer 210, data processing 212, oscillator 214, reference voltage 226, external modification capacitor 216, ground signal 224, sensor capacitor 222, and equivalent resistance 330.

In the first phase, a current value for current source 204 may be determined which results in a start voltage across equivalent resistance 330 that is below reference voltage 326.

The equivalent resistance 330 may be governed the voltage current function expressed by:

$$R_{Equivalent} = \frac{1}{f_s \cdot C_x}$$

Where fs is the switching frequency of phases 1 and 2 as described herein, and Cx is the capacitance of sensor capacitor 222.

Equivalent resistance 330 is inversely proportional to the capacitance of sensor capacitor 222. The presence of an object (e.g., finger) on a sensor increases the capacitance of the sensor, which decreases equivalent resistance 330 formed by the switching phases 1 and 2. A decreased equivalent resistance results in a lower starting voltage. In one embodiment, the start voltage may be governed the voltage current function expressed by:

$$V_{Start} = \frac{1}{f \cdot C_x} \cdot iDAC$$

Where fs is the switching frequency of phases 1 and 2 as described herein, and Cx is the capacitance of sensor capacitor 222 and iDAC is current of current source 204.

A lower starting voltage corresponds to an increased time for current source 204 to charge up external modification capacitor 216, thereby resulting in a larger time that timer 210 will operate. Data processing module 212 may thus process the increased value from timer 210 to indicate the presence of an object relative to the equivalent resistance 330.

Figure 4:
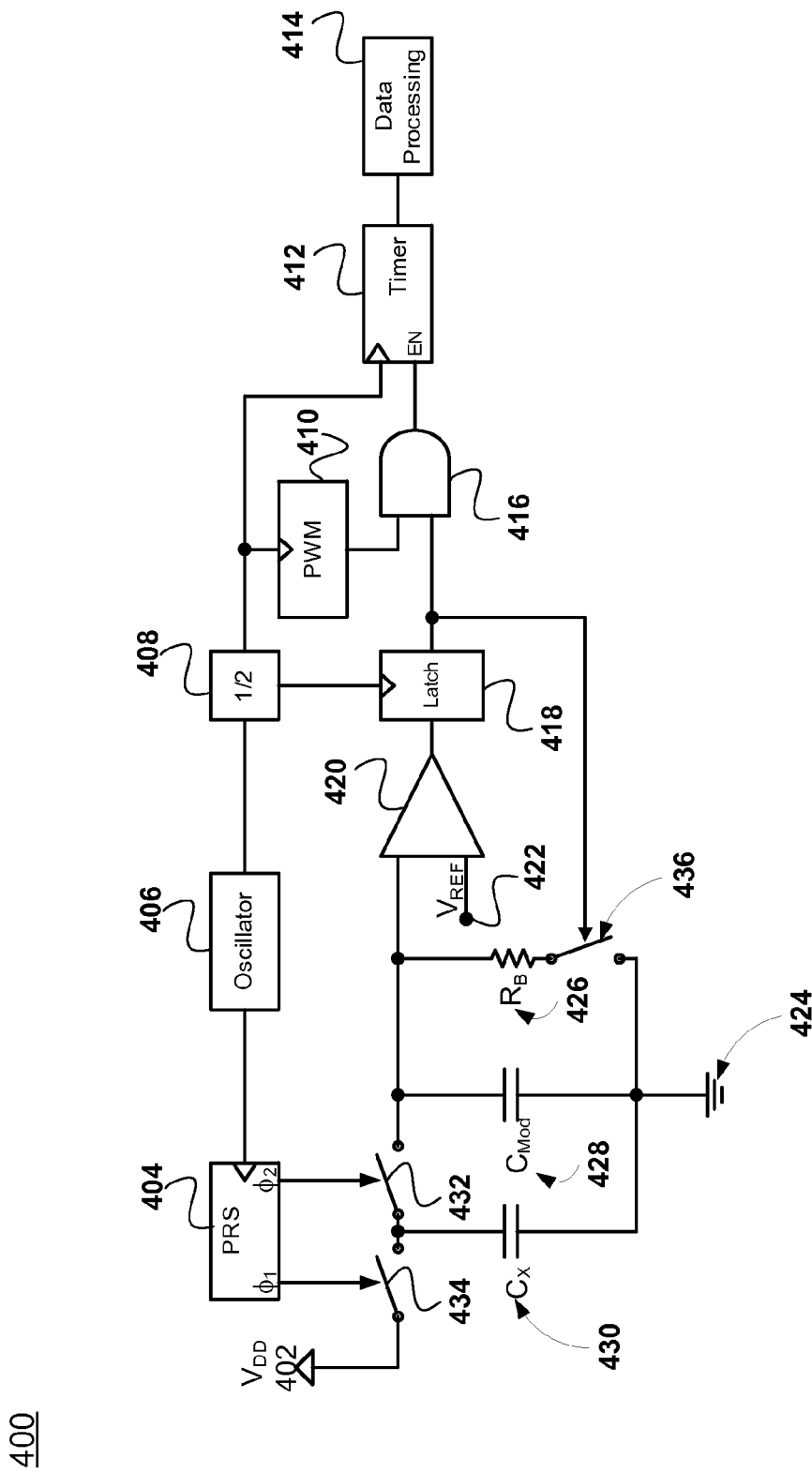
FIG. 4 shows another exemplary sensor circuit, in accordance with one embodiment of the present invention.

FIG. 4 shows another exemplary sensor circuit, in accordance with one embodiment of the present invention. Sensor circuit 400 includes Vdd 402, pseudo random generator 404, oscillator 406, frequency modifier 408, pulse-width modulator 410, counter 412, data processing module 414, and gate 416, latch 418, comparator 420, reference voltage 422, discharge resistor 426, ground signal 424, external modification capacitor 428, sensor capacitor 430, switch 432, switch 434, and switch 436.

Switches 432 and 434 are controlled by pseudo random generator 404, which modulates the voltage across external modification capacitor 428 about reference voltage 422 in charge up and charge down steps. Pseudo random generator 404 reduces the electromagnetic inference susceptibility and radiated emissions of capacitive sensing circuits. In one embodiment, external modification capacitor 428 is larger than sensor capacitor 430.

In one embodiment, switch 434 is used to charge sensor capacitor 430. The capacitance of sensor capacitor 430 varies with the presence of an object (e.g., a finger). After the charging of sensor capacitor 430, switch 434 is decoupled and switch 432 is coupled thereby allowing the charge of sensor capacitor 430 to flow to external modification capacitor 428.

As the charge in external modification capacitor 428 increases, so does the voltage across external modification capacitor 428. The voltage across external modification capacitor 428 may be an input to comparator 420. When the input to comparator 420 reaches the threshold voltage or reference voltage 422, discharge resistor 426 is connected and charge is bled off of external modification capacitor 428 at a rate determined by the starting voltage across the external modification capacitor 428 and the value of discharge resistor 426. As the voltage across external modification capacitor 428 decreases and the voltage passes reference voltage 422, discharge resistor 426 is disconnected from ground 424 via switch 436.

The charge/discharge cycle of the external modification capacitor 428 is manifested as a bit stream on the output of comparator 420. The bitstream of comparator 420 is 'ANDed' with pulse-width modulator 410 via and gate 416 to enable timer 412. Pulse width modulator 410 sets the timeframe or measurement window in which the bit-stream enables and disables timer 412. The capacitance measurement and therefore the presence of an object is a matter of comparing the bit-stream of the comparator to the known, baseline value.

The value of reference voltage 422 affects the baseline level of counts or time measured by timer 412 from a sensor when no finger is on the sensor. This voltage on an external modification capacitor 428 may reach the reference voltage before comparator 420 trips, so the value of reference voltage 422 affects the amount of time that it takes external modification capacitor 428 to charge to reference voltage 422, decreasing the density of the bit-stream during a scan.

The output of timer 412 is used for processing the level of capacitance change and determining the sensor activation state. The duration of these steps is compared relative to each other by looking at the comparator bit-stream density. If the density of the bit-stream is relatively high, the sensor is read as "on". The bit-stream output of comparator 420 is synchronized with system clock via latch 418.

Figure 5:
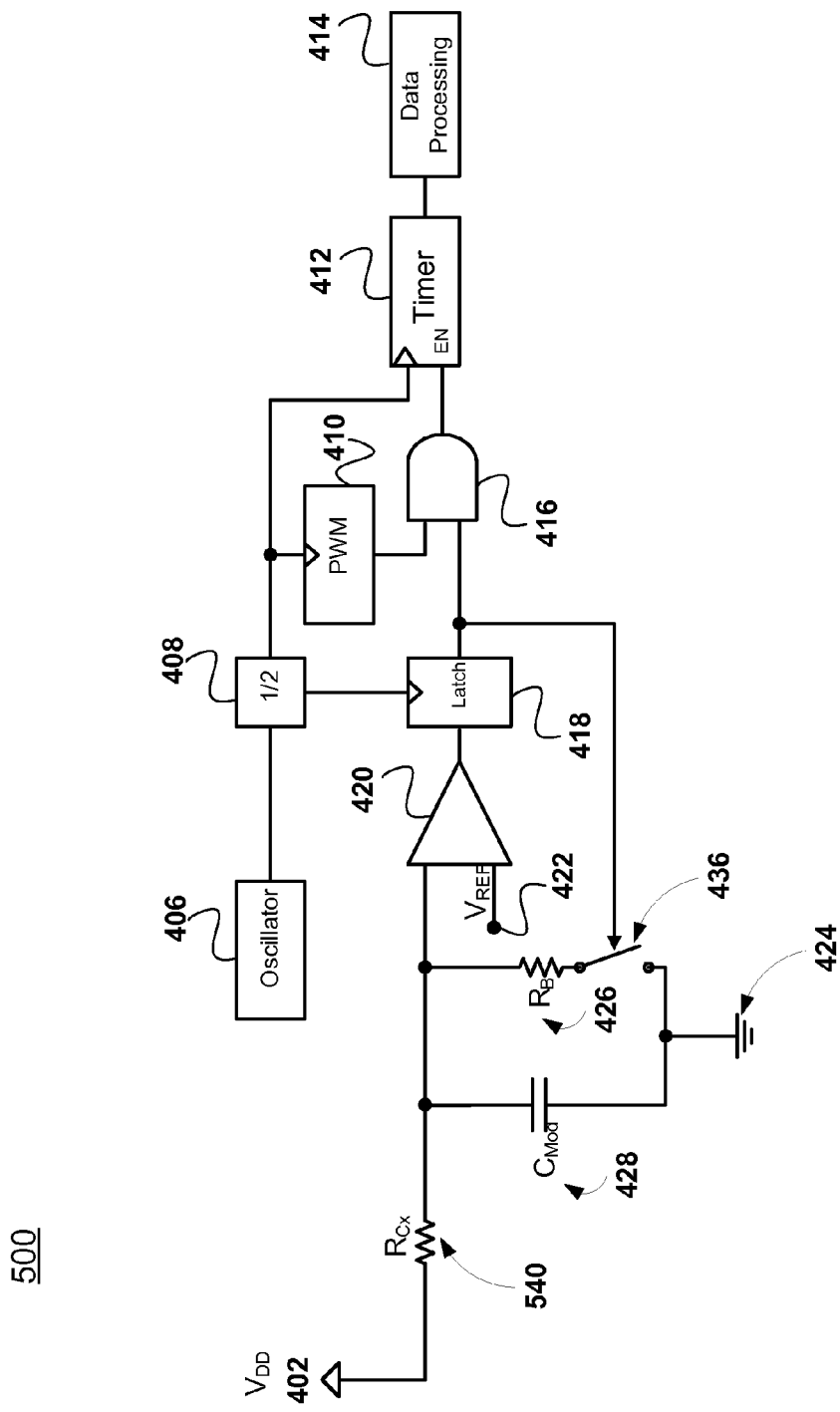
FIG. 5 shows the exemplary sensor circuit of FIG. 4 with an equivalent resistance, in accordance with an embodiment of the present invention.

FIG. 5 shows the exemplary sensor circuit of FIG. 4 with an equivalent resistance. Sensor circuit 500 includes Vdd 402, oscillator 406, frequency modifier 408, pulse-width modulator 410, counter 412, data processing module 414, and gate 416, latch 418, comparator 420, reference voltage 422, discharge resistor 426, ground signal 424, external modification capacitor 428, switch 436, and equivalent resistance 540.

Sensor capacitor 430 is replaced with equivalent resistance 540. Equivalent resistance 540 is inversely proportional to the capacitance of sensor capacitor 430. As such, the presence of an object (e.g., a finger) will result in an increase in capacitance and a corresponding reduction in the resistance of equivalent resistance 540. The reduction of equivalent resistance 540 thereby allows more current to charge external modification capacitor 428 and thereby allowing the voltage across external modification capacitor 428 to reach reference voltage 422 relatively faster.

Scanning a Plurality of Capacitive Sensors

Figure 6:
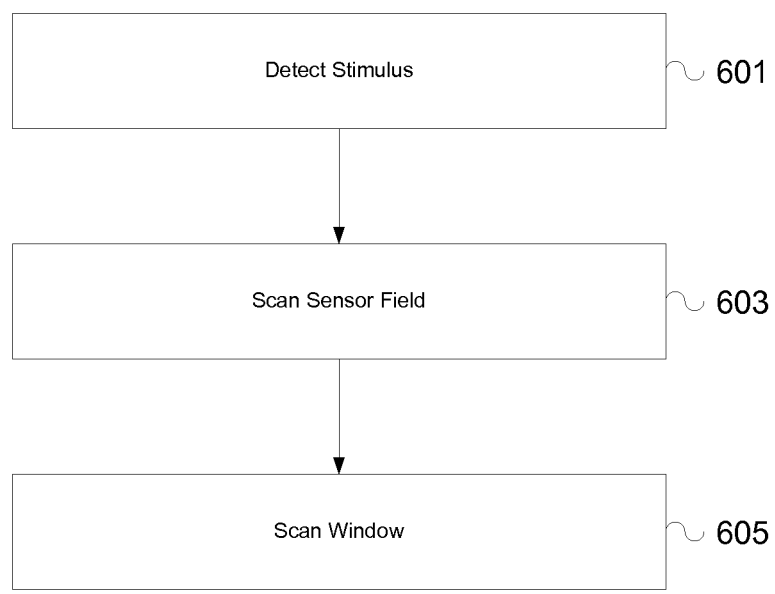
FIG. 6 depicts a flowchart of a method for scanning a plurality of capacitive sensors, in accordance with one embodiment.

With reference now to FIG. 6, a flowchart 600 of a method for scanning a plurality of capacitive sensors is depicted, in accordance with one embodiment. Steps 601-605 describe exemplary steps comprising the process 600 in accordance with the various embodiments herein described.

At step 601, a stimulus is detected in a field of capacitive sensors. The stimulus may be any physical stimulant. In many contemporary applications, the stimulus is typically a physical object, such as a stylus or human finger. The field of capacitive sensors may be implemented according to various shapes and applications. For example, a field of capacitive sensors implemented as a touch pad comprising an interface of a computerized device may be implemented as a grid of capacitive sensors, arranged in intersecting columns and rows spanning the area encompassed by the touch pad. In one embodiment, the capacitive sensors comprising the field of capacitive sensors are implemented as circuits as herein described. In one embodiment, at 601 all sensors are scanned at a slow rate or a subsection of sensors are scanned at a normal rate. This is a coarse scan.

At step 603, the field of capacitive sensors is scanned (e.g., activated and sampled) to determine the position of the stimulus within the field. The position of the stimulus within the field may be determined according to a centroid positioning algorithm. In one embodiment, the entire field of capacitive sensors is scanned at a high rate or its maximum rate during 603, to achieve a high resolution (accuracy). In a further embodiment, a window of sensors to be scanned in step 605 is also developed during step 603 by determining the precise position of the stimulus.

At step 605, once the position of the stimulus within the field of capacitive sensors is determined (in step 603), a window of sensors is scanned while the other sensors in the field outside the window are not scanned. Step 605 persists for as long as the stimulus is detected in its current (original) position. In one embodiment, the window of sensors includes the sensors directly corresponding to the position of the stimulus (e.g., the sensors positioned for sensing the area in the field of sensors currently occupied by the stimulus). These are the active sensors whose output is used to determine the position of the stimulus In one embodiment, the window of sensors also comprises one or more sensors proximate to the position of the stimulus in the field of capacitive sensors but which may not be deemed active in 603. While being scanned, these sensors provide the window the ability to detect a motion of the stimulus within the corresponding proximate sensors. For example, in one embodiment, the window of sensors comprises an additional, adjacent sensor in each of four directions (above, below, to the right and to the left) relative to the position of the active sensors.

If the stimulus were displaced from its original position to a position corresponding to one or more of the additional scanned sensors in the window, the already-scanned sensor(s) would become active and would be able to detect the presence (and thus, the motion) of the stimulus from its original position. In a further embodiment, the window would be adjusted to account for the new position (and subsequent positions) of the stimulus. Adjustment may comprise, for example, scanning additional sensors proximate to the new position of the stimulus and not scanning the sensors corresponding to the original position of the stimulus but no longer corresponding to the new position of the stimulus.

In a further embodiment, an entire arrangement of sensors (e.g., a row or column) in one or more directions relative to the position of the stimulus is also scanned. In alternate embodiments, the window may include an additional sensor (or arrangement of sensors) in other denominations. In still further embodiments, the additional sensors comprise sensors which may not be immediately adjacent to the detected position of the stimulus. Instead, the additional sensors may comprise sensors at some other discrete location calculated (or designed) to provoke or entice a motion.

In one embodiment, a window of scanned sensors may comprise only the sensors directly corresponding to the position of the stimulus. When the sensors comprising the perimeter of the stimulus position detect a change (e.g., the stimulus achieves a motion), the window may anticipate the motion of the stimulus by referencing the detected change in position. For instance, a stimulus which observes a motion upwards would detect a change in the one or more sensors comprising the lower perimeter of the original position (e.g., the presence is no longer detected). According to this embodiment, the window may adjust appropriately by scanning the sensors directly opposite to the sensors comprising the lower perimeter of the original position (e.g., sensors "above" the upper perimeter of the original position) and not scanning the sensors comprising the (former) lower perimeter of the original position.

By performing the scan in this fashion, embodiments of the present invention provide a fast scan time with greater resolution and sensitivity. The scan also provides for lower power consumption due to the faster scan time and more sleep operation.

Scanning a Capacitive Sensor Array

Figure 7:
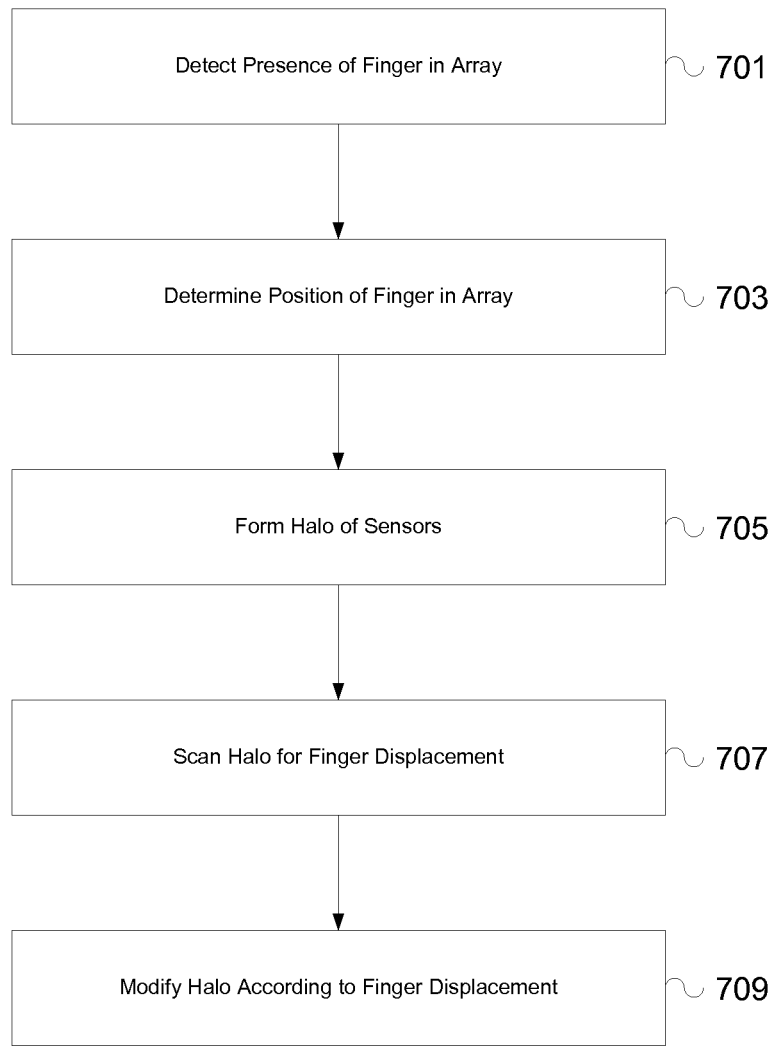
FIG. 7 depicts a flowchart of a method for scanning a capacitive sensor array, in accordance with one embodiment.

With reference now to FIG. 7, a flowchart 700 of a method for scanning a capacitive sensor array is depicted, in accordance with one embodiment. Steps 701-709 describe exemplary steps comprising the process 700 in accordance with the various embodiments herein described.

At step 701, the presence of a finger (e.g., a physical stimulant such as a human finger) is detected in the capacitive sensor array. The capacitive sensor array may be implemented according to various shapes and applications. For example, a capacitive sensor array may be employed as a two dimensional array of intersecting columns and rows forming a rectangular grid. Other embodiments include a linear capacitive sensor array (that is, a two dimensional array with but one row or column), or a radial capacitive sensor array. In one embodiment, each capacitive sensor comprising the array of capacitive sensors is implemented as a circuit as described herein.

In one embodiment, the presence of a finger is detected at 701 in the capacitive sensor array during a preliminary, power-saving state. During this state, the sensors comprising the capacitive sensor array are all scanned at a relatively slow rate, or a subsection of the sensors are scanned at a standard rate. The reduction in rate and/or coverage adversely affects the sensitivity of the corresponding sensors (and thus, the sensor array as a whole). Accordingly, the presence of a finger is detected with coarse position accuracy, although further information (e.g., specific location, magnitude) may be unavailable during this state.

At step 703, the location of the finger in the capacitive sensor array is determined during a first mode. The location of the finger within the field may be determined according to a centroid positioning algorithm based on the active sensors. During the first mode, the entire capacitive sensor array is scanned at its maximum rate, to achieve the highest available resolution, and to determine the location of the finger with the greatest degree of accuracy. An active sensor means a sensor whose output signal contributes to a position detecting computation, e.g., that contributes to the centroid computation.

At step 705, a halo of sensors encompassing the location of the finger (as determined in step 703) is formed by activating the sensors corresponding to the location of the finger. In one embodiment, the halo includes an additional perimeter of one or more capacitive sensors surrounding the active sensors corresponding to the location of the finger. In a further embodiment, where available, the perimeter comprises a ring of sensors of at least one sensor in width, encapsulating the finger's location. Accordingly, the ring of sensors may be abridged by, for example, the boundaries comprising the capacitive sensor array (e.g., the edge of a touchpad). In alternate embodiments, the ring of sensors may encapsulate other sensors in addition to those corresponding to the location of the finger At step 707, the capacitive sensors in the halo of sensors (formed in step 705) are scanned during a second mode. All other sensors not within the halo of sensors are no longer being scanned. Step 707 persists for as long as the finger is detected in this current (original) location. The halo of sensors includes the active sensors directly corresponding to the location determined of the finger and other nearby sensors (e.g., the sensors located in, or directed to sensing the area in the field of sensors currently occupied by the finger). While scanned, these sensors in the halo provide the halo the ability detect a contiguous motion of the finger within the corresponding proximate sensors.

By limiting the scanning of sensors to a subsection of the array (e.g., the halo), the rate at which power is consumed while the finger's presence is detected is greatly reduced. In one embodiment, the halo of sensors is scanned at a normal or maximum rate. In this embodiment, the sensitivity and resolution of the sensor array is largely maintained (equivalent for sensors within the halo), while the rate of power consumption is reduced by not scanning the sensors outside of the halo. In an alternate embodiment, the halo of sensors may be scanned at a rate less than that of normal (or maximum). According to this embodiment, the sensitivity (and resolution) of the capacitive sensor array may be reduced (even within the halo), but further gains may be achieved in reducing the rate of power consumption.

Finally, at step 709, the halo of capacitive sensors is modified according to a displacement of the finger during the second mode. In one embodiment, the halo of sensors comprises an additional, adjacent sensor in each of four directions (above, below, to the right and to the left) relative to the location of the finger. If the finger were displaced from its original location to a location corresponding to one or more of the additional sensors in the halo, the already-scanned sensor would be able to detect the presence (and thus, the motion) of the finger from its original location. In a further embodiment, the halo would be adjusted to account for the new location (and subsequent locations) of the finger. Adjustment of the halo may comprise, for example, scanning additional sensors proximate to the new location of the finger and not scanning the sensors corresponding to the original location of the finger but no longer corresponding to the new location of the finger.

In a further embodiment, an entire arrangement of sensors (e.g., a row or column) in one or more directions relative to the location of the finger is also scanned. In still further embodiments, the additional sensors comprise sensors which may not be immediately adjacent to the detected location of the finger. Instead, the additional sensors may comprise sensors at some other discrete location calculated (or designed) to provoke or entice a motion. Alternate embodiments may employ a halo comprising only the sensors directly corresponding to the location of the finger, wherein the halo may anticipate the motion of the finger by referencing the detected change in the finger's presence at one or more sensors in the halo.

Sensor Behavior Corresponding to Stimulus in Power Saving Mode

Figure 8:
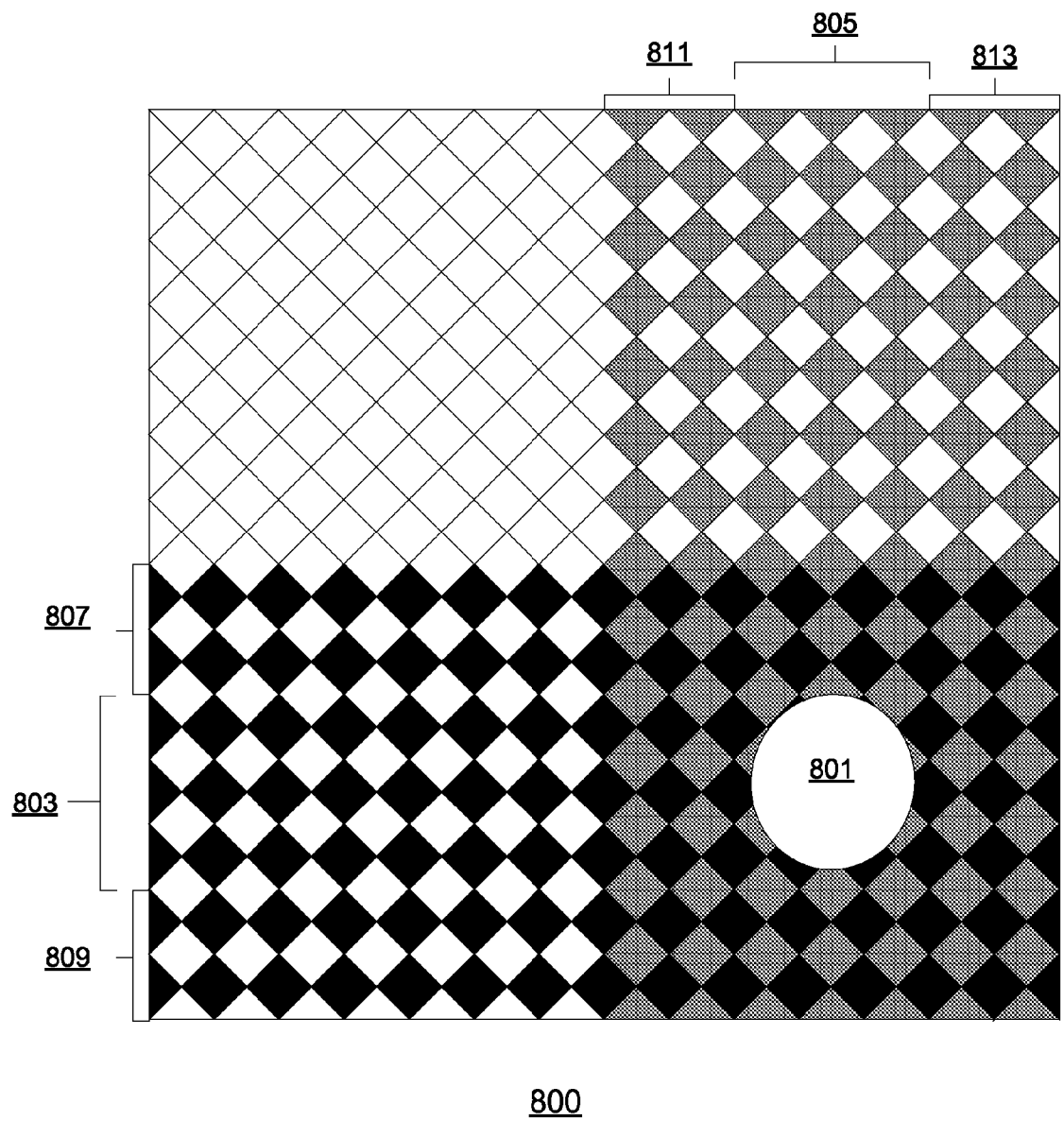
FIG. 8 depicts an illustration of an exemplary capacitive sensor array exhibiting behavior of sensors during a power saving mode corresponding to the presence of a detected stimulus, in accordance with one embodiment.

With reference now to FIG. 8, an illustration of an exemplary capacitive sensor array 800 exhibiting behavior of sensors during a power saving mode corresponding to the presence of a detected stimulus is depicted, in accordance with one embodiment. As depicted, FIG. 8 includes a stimulus 801, activated sensor arrangements (e.g., activated rows 803, activated columns 805), and halo portions (e.g., halo sensor arrangements 807, 809, 811, 813).

As presented in FIG. 8, capacitive sensor array 800 is a grid of capacitive sensors (depicted as diamond tiles). The position of stimulus 801 is located in roughly the center of the lower right quadrant of capacitive sensor array 800, and occupies, in whole or in part, a circular area of roughly sixteen sensors, comprising four rows and four columns of sensors. The position of stimulus 801 may correspond, for example, to the position of a fingertip proximate to the capacitive sensor array 800.

As depicted, capacitive sensor array 800 also includes activated sensor arrangements, specifically, a plurality of activated rows of sensors 803 (depicted as black tiles) and a plurality of activated columns of sensors 805 (presented as grey tiles) corresponding to the presence of the detected stimulus 801. As shown, the presence of a detected stimulus 801 activates an entire arrangement of sensors (e.g., every sensor in a row or column) associated with the sensors corresponding to the position of the detected stimulus.

In alternate embodiments, the presence of a detected stimulus may activate only one or more immediate sensors, or a subsection of an arrangement of sensors. As presented, the activated sensors comprising activated rows 803 would detect a motion (e.g., displacement) of stimulus 801 along the horizontal axis relative to the current position of the stimulus. Likewise, the activated sensors comprising activated columns 805 would detect a motion of stimulus 801 along the vertical axis relative to the current position of the stimulus.

During a power saving mode, not every sensor will be activated. According to various embodiments, a window or halo of sensors may be scanned in addition to the activated sensor arrangements (e.g., activated rows 803 and activated columns 805). As depicted, capacitive sensor array 800 employs a window (or halo) of a full two sensors in width. For example, halo sensor arrangement 807 includes the next two rows immediately above the current detected position of stimulus 801. Halo sensor arrangement 809 includes the next two rows immediately below the current detected position of stimulus 801. Meanwhile, halo sensor arrangement 811 includes the next two columns immediately to the left of the current detected position of stimulus 801. Halo sensor arrangement 813 includes the next two columns immediately to the right of the current detected position of stimulus 801. According to this configuration, a displacement of stimulus 801 in the additional sensor arrangements (e.g., halo sensor arrangement 807, 809, 811 and 813) would still be detected, even if outside the original sensor arrangements activated by the presence of the stimulus.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for scanning a plurality of capacitive sensors in a capacitive sensor array, the method comprising:

detecting a stimulus in a field of capacitive sensors comprising said plurality of capacitive sensors, wherein detecting the stimulus in said field of capacitive sensors comprises scanning all capacitive sensors in said field at a coarse scanning rate;

scanning said field of capacitive sensors to determine a first position of said stimulus in said field of capacitive sensors, wherein said first position indicates first one or more capacitive sensors in said field of capacitive sensors, and wherein scanning said field of capacitive sensors to determine said first position of said stimulus further comprises determining said first position of said stimulus according to a centroid positioning algorithm of activated sensors; and after determining said first position of said stimulus, selecting a subsection of said plurality of capacitive sensors within said field of capacitive sensors, wherein each of the capacitive sensors in the subsection is selected based at least in part on its proximity to said first one or more capacitive sensors indicated by said first position of said stimulus; and scanning only the selected subsection of said plurality of capacitive sensors at a second scanning rate, wherein said second scanning rate is greater than or equal to said coarse scanning rate.

2. The method of claim 1, wherein said subsection comprises:

a capacitive sensor activated by a proximity to said stimulus; and a capacitive sensor corresponding to a subsequent displacement of said stimulus.

3. The method of claim 2, wherein said capacitive sensor corresponding to a subsequent displacement of said stimulus is proximate to said capacitive sensor activated by said proximity to said stimulus.

4. The method of claim 1, wherein determining said first position of said stimulus in said capacitive sensor array further comprises:

scanning all of said capacitive sensors in the capacitive sensor array at the second scanning rate to determine said first position of said stimulus.

5. The method of claim 1, wherein said scanning of said subsection at said second scanning rate is continued to be performed while said stimulus is detected in said first position.

6. The method of claim 1 further comprising:

updating said first position of said stimulus according to a motion of said stimulus; and adjusting said scanning of said subsection according to said motion of said stimulus.

7. The method of claim 6, wherein said motion of said stimulus comprises a displacement of said stimulus from said first position to a second position in said subsection of capacitive sensors.

8. The method of claim 7, wherein said adjusting said scanning of said subsection comprises scanning a non-scanned capacitive sensor corresponding to said second position of said stimulus in said subsection.

9. The method of claim 7, wherein adjusting said scanning of said subsection comprises terminating said scanning of a capacitive sensor which does not correspond to said second position of said stimulus.

10. The method of claim 1, wherein selecting said subsection comprises including a particular capacitive sensor in the subsection based on proximity to a particular one of said first one or more capacitive sensors indicated by said first position of said stimulus.

11. A method for scanning a capacitive sensor array, the method comprising:
- detecting a presence of a finger in proximity to said capacitive sensor array using a first scan rate;
- determining a location of said finger in said capacitive sensor array during a first mode, wherein determining the presence of said finger further comprises determining said location of said finger according to a centroid positioning algorithm of activated sensors, and wherein said location indicates at least one capacitive sensor activated by said finger;
- determining a halo of capacitive sensors corresponding to said location of said finger in said capacitive sensor array, wherein the halo is selected to include one or more capacitive sensors that form a perimeter having a width of at least one capacitive sensor, and wherein each of the one or more capacitive sensors in the halo is selected to be proximate to said at least one capacitive sensor activated by the finger;
- scanning said halo of capacitive sensors during a second mode at a second scan rate, wherein said second scan rate is greater than or equal to said first scan rate; and
- modifying said halo of capacitive sensors according to a displacement of said finger during said second mode.

12. The method of claim 11, wherein determining said location of said finger in said capacitive sensor array during said first mode comprises:
- scanning all of said capacitive sensor array at said second scan rate to determine said location of said finger.

13. The method of claim 11, wherein said determining said halo of capacitive sensors comprises:
- scanning a plurality of capacitive sensors that are activated and correspond to said location of said finger in said array; and
- scanning a plurality of other capacitive sensors comprising said perimeter along said plurality of capacitive sensors corresponding to said location.

14. The method of claim 11, wherein said first scan rate consumes power at a lower rate than said second scan rate.

15. A system for scanning for a position of a stimulus in a field of sensors, the system comprising:
- a controller; and
- an array of sensors, said sensors comprising:
  - a conductive pad;
  - surrounding ground; and
  - a connection coupling said sensors to said controller, wherein said sensors comprising said array are scanned at a high scanning rate to determine a position of said stimulus during a first state, wherein said position indicates one or more sensors, wherein a subsection of sensors is selected to comprise said one or more sensors indicated by said position of said stimulus along with a plurality of sensors corresponding to a subsequent displacement of said stimulus, wherein said subsection of sensors is scanned during a second state, and wherein each of the plurality of sensors corresponding to the subsequent displacement of said stimulus is selected based on proximity to a sensor of said one or more sensors indicated by the position of the stimulus according to a centroid positioning algorithm of activated sensors determined during the first state.

16. The system of claim 15, wherein said plurality of sensors corresponding to the subsequent displacement comprises a halo of sensors forming a perimeter along said one or more sensors indicated by the position of the stimulus.

17. The system of claim 16, wherein said perimeter is modified according to a displacement of said stimulus in said field of sensors.

18. The system of claim 15, wherein said second state consumes power at a reduced rate relative to said first state.

19. The system of claim 15, wherein said sensors are capacitive sensors.

* * * * *